United States Patent
Schuttenberg et al.

(10) Patent No.: US 9,141,543 B1
(45) Date of Patent: Sep. 22, 2015

(54) SYSTEMS AND METHODS FOR WRITING DATA FROM A CACHING AGENT TO MAIN MEMORY ACCORDING TO A PRE-CLEAN CRITERION

(71) Applicant: Marvell International, Ltd., Hamiltin (BM)

(72) Inventors: Kim Schuttenberg, Gilbert, AZ (US); R. Frank O'Bleness, Tempe, AZ (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 165 days.

(21) Appl. No.: 13/714,802

(22) Filed: Dec. 14, 2012

Related U.S. Application Data

(60) Provisional application No. 61/584,178, filed on Jan. 6, 2012.

(51) Int. Cl.
*G06F 12/08* (2006.01)
(52) U.S. Cl.
CPC .................................. *G06F 12/0802* (2013.01)
(58) Field of Classification Search
USPC ......................................... 711/118, 137, 143
See application file for complete search history.

(56) References Cited

U.S. PATENT DOCUMENTS

| | | | |
|---|---|---|---|
| 5,752,262 A | 5/1998 | Cassetti et al. | |
| 5,918,246 A | 6/1999 | Goodnow et al. | |
| 6,134,634 A | 10/2000 | Marshall, Jr. et al. | |
| 6,134,643 A | 10/2000 | Kedem et al. | |
| 6,463,509 B1 | 10/2002 | Teoman et al. | |
| 7,277,993 B2 | 10/2007 | Garney | |
| 7,441,081 B2 | 10/2008 | Humlicek | |
| 2009/0265514 A1* | 10/2009 | Biles et al. | 711/154 |

FOREIGN PATENT DOCUMENTS

WO   WO 2009153707 A1 * 12/2009 ............. G06F 12/08

OTHER PUBLICATIONS

Stuecheli, Jeffrey et al., The Virtual Write Queue: Coordinating DRAM and Last-Level Cache Policies, ISCA '10, Jun. 19-23, 2010, Saint-Malo, France, Copyright 2010 ACM 978-1-4503-0053—Jun. 10, 2006, 11 pages.

* cited by examiner

*Primary Examiner* — Aimee Li
*Assistant Examiner* — Dustin Bone

(57) ABSTRACT

Systems and methods for writing data from a caching agent to a main memory in a computer system are provided. In systems and methods for writing data from a caching agent to a main memory in a computer system, a notice of an occurrence of a triggering event is received. In response to the receipt of the notice, data is retrieved from a storage array of the caching agent in accordance with a pre-clean criterion. The pre-clean criterion identifies the data that is being retrieved from the storage array prior to receiving a command on the data. The data is written to the main memory, where the writing of the data causes a memory address associated with the data to have identical contents in the storage array and in the main memory.

20 Claims, 7 Drawing Sheets

SYSTEMS AND METHODS FOR WRITING DATA FROM A CACHING AGENT TO MAIN MEMORY ACCORDING TO A PRE-CLEAN CRITERION

CROSS-REFERENCE TO RELATED APPLICATIONS

This disclosure claims priority to U.S. Provisional Patent Application No. 61/584,187, filed on Jan. 6, 2012, which is incorporated herein by reference.

TECHNICAL FIELD

The technology described in this document relates generally to caching in computer systems and more particularly to systems and methods for writing data from a caching agent to main memory according to a pre-clean criterion.

BACKGROUND

A typical computer system may include one or more microprocessors that execute code and operate on data stored within the computer system's memory and disk drives. To facilitate the fetching and storing of instructions and data, a microprocessor may include one or more levels of cache memory. Microprocessor cache memory may include, for example, a level one (L1) cache and a level two (L2) cache, and such cache memory may reside on-chip or off-chip. Frequently accessed data may be stored in the cache after an initial access of the data from the main memory, and subsequent accesses to the frequently accessed data may be made to the cache instead of to the main memory.

Types of cache memory include write-through cache and write-back cache. In computer systems using write-through cache, when the processor issues a command to write data to the main memory, the data is written both to the cache and to the main memory. In systems using write-back cache, data is generally only written to the main memory when data in the cache is being replaced with some other data (i.e., data is only written to the main memory during an eviction of a cache line). Write-back cache is generally faster than write-through cache because writing to the slower main memory is avoided on write operations in write-back cache. In write-back cache, a cache line is "dirty" if the data of the cache line has been updated by the computer system but the corresponding data of the main memory has not also been updated. A cache line is "clean" if the cache line has the same data as is stored the main memory.

SUMMARY

The present disclosure is directed to systems and methods for writing data from a caching agent to a main memory in a computer system. In a method for writing data from a caching agent to a main memory in a computer system, a notice of an occurrence of a triggering event is received. In response to the receipt of the notice, data is retrieved from a storage array of the caching agent in accordance with a pre-clean criterion. The pre-clean criterion identifies the data that is being retrieved from the storage array prior to receiving a command on the data. The data is written to the main memory, where the writing of the data causes a memory address associated with the data to have identical contents in the storage array and in the main memory.

In another example, a system for writing data from a caching agent to a main memory in a computer system includes a processing unit, the caching agent coupled to the processing unit, and a main memory coupled to the caching agent. The system further includes a cache controller coupled to the processing unit and the main memory, where the cache controller is configured to receive notice of an occurrence of a triggering event. In response to the receipt of the notice, the cache controller causes data to be retrieved from a storage array of the caching agent in accordance with a pre-clean criterion, where the pre-clean criterion identifies the data that is being retrieved from the storage array prior to receiving a command on the data. The cache controller further causes a writing of the data to the main memory. The writing of the data causes a memory address associated with the data to have identical contents in the storage array and in the main memory.

DETAILED DESCRIPTION

Figure 1:
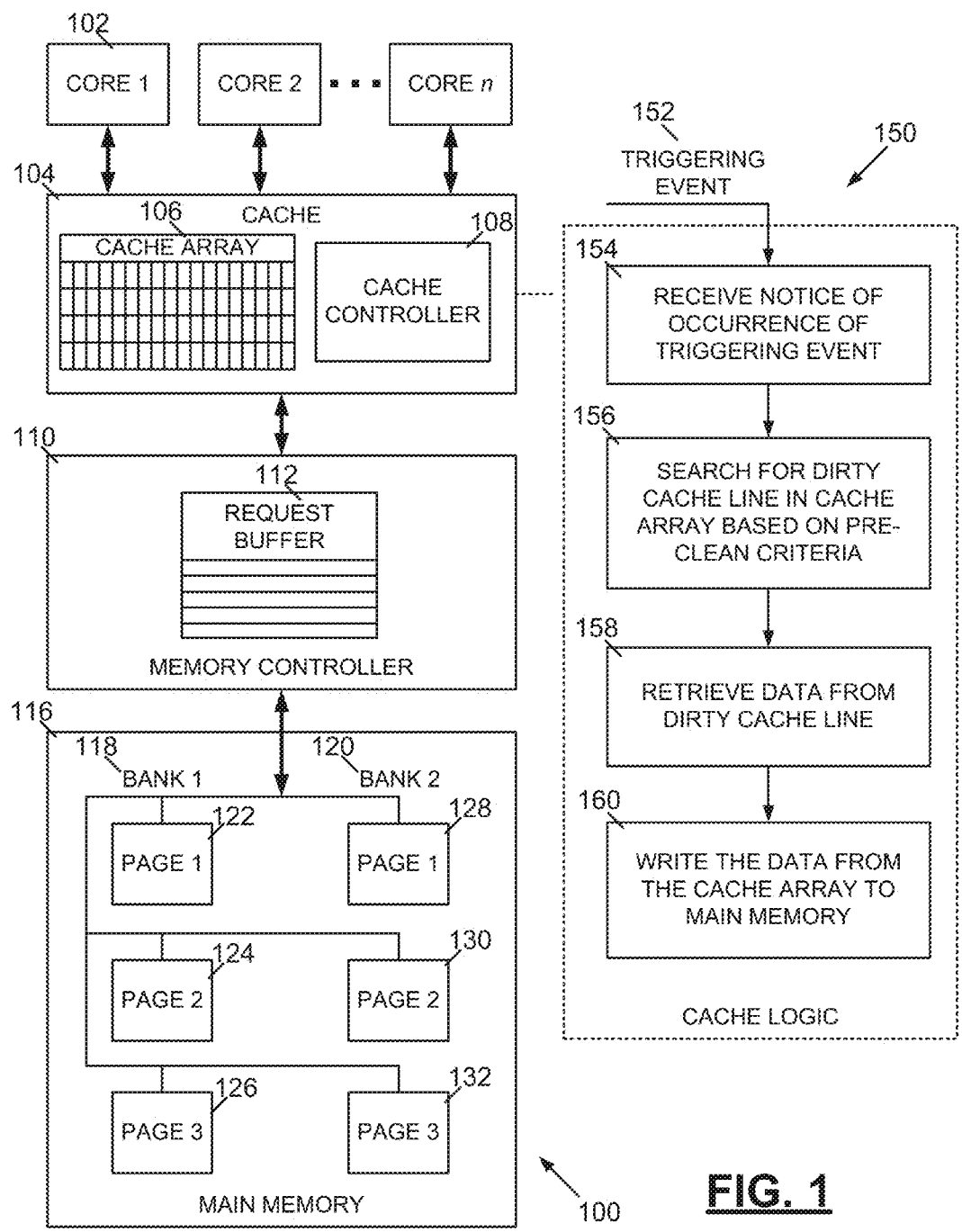
FIG. 1 depicts an example computer system including a cache controller configured to write data from a cache storage array to a main memory prior to receiving an explicit command to write the data.

FIG. 1 depicts an example computer system 100 including a cache controller 108 configured to write data from a cache storage array 106 to a main memory 116 prior to receiving an explicit command to write the data. The computer system 100 includes n processing cores 102, a data cache 104 including the cache storage array 106, a memory controller 110, and the main memory 116. The n processing cores 102 are general purpose processing units known to those of skill in the art of computing and are capable of processing tasks driven by internal or external interrupts. The n processing cores 102 may be connected to various input devices and output devices (e.g., keyboard, mouse, display monitor, printer, speakers, and so on) and coupled to any number of different memory devices (e.g., read only memory, random access memory, disk drives, and the like). Although the example computer system 100 includes a plurality of processing cores 102, in other examples, a single processing core is used to carry out instructions of computer programs.

In the example computer system 100 of FIG. 1, the n processing cores 102 are coupled to the main memory 116, which may be any combination of random access memory (RAM), dynamic RAM (DRAM), static RAM (SRAM), synchronized DRAM (SDRAM), FLASH memory, or the like.

The main memory 116 includes a plurality of memory banks 118, 120, with each of the memory banks 118, 120 being subdivided into a plurality of memory pages 122, 124, 126, 128, 130, 132. The n processing cores 102 access the main memory 116 via the memory controller 110. When a processing core 102 needs to access the main memory 116, a read request or a write request is sent from the processing core 102 to the memory controller 110, and the memory controller 110 in turn sends a corresponding read request or write request to the main memory 116. Consequently, data from the processing cores 102 can be written to the main memory 116, or data can be read from the main memory 116 by the processing cores 102. In the example of FIG. 1, the memory controller 110 includes a request buffer 112, which may be used to reorder requests from the n processing cores 102 for greater efficiency (e.g., grouping read requests and write requests together, grouping requests that pertain to a same page of the main memory 116 together).

When a processing core of the n processing cores 102 attempts to read or write to a particular address in the main memory 116, a state of the main memory 116 can affect a cost in time and power associated with completing the read operation or write operation. In particular, whether certain banks and pages are open or closed in the main memory 116 may determine whether the main memory 116 is in a correct state to access the particular address requested. For example, if data is written to the page 122 of the bank 118, then this particular page is open, and subsequent write commands directed to page 122 are completed in a relatively short amount of time while the page 122 remains open. On the other hand, however, if the subsequent write commands to the page 122 are made after the page 122 has been closed, a change in state must occur in the main memory 116 in order to complete the subsequent write commands. The change in state, requiring a closing of an open page of the main memory 116 and an opening of the page 122 for writing, invokes an increased cost in time and power. Specifically, the increased cost in time and power may be approximately an order of magnitude higher as versus situations where no state change must occur in the main memory 116. Another example of a state change in the main memory 116 that is associated with an increased cost in time and power occurs when a write command is issued following a read command, or vice versa. Further, a state change in the main memory 116 may occur if one of the banks 118, 120 needs to be recharged prior to a read operation or write operation.

The data cache 104 is coupled to both the n processing cores 102 and the main memory 116. In an example system, the data cache 104 is a microprocessor cache. The microprocessor cache may include one or more levels of cache memory (e.g., L1, L2, and L3 cache memory residing on-chip or off-chip). In another example, the data cache 104 is a separate disk cache residing between the n processing cores 102 and the main memory 116. Read operations and write operations to the data cache 104 are controlled by the cache controller 108. The data cache 104 has a higher access speed than the main memory 116, and thus, frequently accessed data may be stored in the cache 104, such that accesses to the data can utilize the higher access speed of the cache 104. When the n processing cores 102 issue a read command seeking access to data stored in the main memory 116, the n processing cores 102 first examine the storage array 106 of the cache 104. If the requested data is found in the storage array 106 of the cache 104, the data is read directly from the storage array 106. If the requested data is not found in the cache 104, the cache controller 108 reads a set of data including the requested data from the main memory 116 and stores the set of data to the storage array 106 of the cache 104.

In write-back cache, when the n processing cores 102 seek to write data to the main memory 116, the n processing cores 102 instead write the data to the storage array 106 of the cache 104, and the cache 104 later updates the main memory 116 with the data. In one implementation, the cache 104 writes data from the cache storage array 106 to the main memory 116 in two circumstances. A first circumstance occurs when an operating system running on one of the n processing cores 102 explicitly instructs the cache 104 to write data to the main memory 116. The data written from the cache 104 to the main memory 116 in this manner may be well-grouped and ordered. However, the writing of the data in this manner is generally not available to application code, which may have no knowledge of an exact caching hierarchy of the computer system 100 on which the application code is running. The second circumstance in which the cache 104 writes data from the cache storage array 106 to the main memory 116 occurs during a capacity eviction. In the capacity eviction, a dirty line of the cache storage array 106 (i.e., a unit of data in the cache 104 that has a state that does not match a state of the corresponding unit of data in the main memory 116) is removed from the cache 104 (i.e., evicted) to make room for new data to be stored in the cache 104. In this circumstance, the data of the dirty line is written from the storage array 106 of the cache 104 to the main memory 116 as part of the eviction of the line.

Flowchart 150 of FIG. 1 illustrates steps performed by the cache controller 108 to write data from the cache 104 to the main memory 116 in an additional circumstance. The writing of the data to the main memory 116 that occurs in the flowchart 150 is in response to a triggering event 152. The triggering event 152 is not an explicit command to write the data from the cache 104 to the main memory 116, and thus, the writing of the data performed in the flowchart 150 is a preemptive writing of data intended to produce a savings in time and power. In one example, the triggering event 152 is an eviction of a dirty line from the cache 104. In this example, the method of FIG. 1 enables data for a plurality of dirty lines to be written from the cache 104 to the main memory 116 in short order. Writing the plurality of dirty lines from the cache 104 to the main memory 116 in short order may be an efficient way of writing these lines to the main memory 116 that produces the savings in time and power.

In one example, the savings in time and power is produced by writing to the main memory 116 a cache line that is adjacent to a first cache line that is being written to the main memory 116 as a result of an eviction procedure. In this example, the eviction procedure and the write-back of the first cache line is the triggering event 152. When the write-back of the first cache line occurs, the cache controller 108 performing the steps of the flowchart 150 makes a determination as to whether the cache line that is adjacent to the first cache line is dirty or not. If the adjacent cache line is dirty, the adjacent cache line is written to the main memory 116 immediately after the writing of the first cache line. Because the adjacent cache line and the first cache line are located at adjacent addresses in the main memory 116, the lines are likely on a same bank and a same page of the main memory 116, such that writing both of the lines does not require a change in state of the main memory 116.

In the example involving the adjacent cache line and the first cache line, the adjacent line is not evicted from the cache 104 and instead is only "cleaned" (i.e., the data of the adjacent line is written back to the main memory 116 so that the data of the adjacent line and the corresponding unit of data in the main memory 116 have identical contents). At a later point in time, when the cleaned, adjacent cache line must be evicted from the cache 104 to make room for new data to be stored in the cache 104, the cleaned, adjacent cache line does not require a write-back to the main memory 116. Had the adjacent cache line not been written back to the main memory 116 at the earlier point in time (i.e., following the writing of the first cache line during the eviction of the first cache line), the adjacent cache line would have been written to the main memory 116 at the later time. Writing the adjacent cache line at the later point in time may have required a change in a state of the main memory 116. By writing back the first cache line and the adjacent cache line together, in short order, the adjacent cache line is written to the main memory 116 at a lower cost (i.e., at a time when no state change must occur in the main memory 116), thus avoiding the potentially higher cost associated with the state change at the later point in time.

In the flowchart 150 of FIG. 1, the cache controller 108 performs the steps 154, 156, 158, 160 to write data from the cache 104 to the main memory 116 in response to the triggering event 152, where the triggering event is not an explicit command to write the data. At 154, the cache controller 108 receives notice of an occurrence of the triggering event 152. As described above, the triggering event 152 may be an eviction of a line in the cache storage array 106. In other examples, the triggering event 152 is an expiration of a timer or a different detectable event. At 156, the cache controller searches for a dirty cache line in the cache storage array 106 based on pre-clean criteria. The pre-clean criteria is identified as such because it is intended to enable a cleaning of one or more cache lines prior to receiving an explicit command directed to the one or more cache lines. The pre-clean criteria identify the lines of the cache storage array 106 that should be written to the main memory 116 in accordance with the steps of the flowchart 150.

As described in the example above, the pre-clean criteria may specify that the cache controller 108 must search for a single cache line that is adjacent to a first cache line that is to be written to the main memory 116 as a result of an eviction procedure. In another example, the pre-clean criteria specify that the cache controller 108 must search for all dirty cache lines that are "nearby" (e.g., within a threshold number of memory addresses) to a first cache line that is to be written to the main memory 116 as a result of an eviction procedure. In another example, the pre-clean criteria specify that the cache controller 108 must dynamically search for dirty cache lines to clean based on previously-identified dirty lines.

At 158, data is retrieved from the dirty cache line identified at 156. At 160, the retrieved data is written from the cache storage array 106 to the main memory 116. The writing of the data causes a memory address associated with the written data to have identical contents in the cache storage array 106 and in the main memory 116. As indicated in FIG. 1, the steps 154, 156, 158, 160 performed by the cache controller 108 may be implemented via instructions stored in cache logic of the cache controller 108. In another example, a command interface is used to introduce commands that define or modify the pre-clean criteria, triggering events, or other aspects of the steps performed by the cache controller 108.

Figure 2:
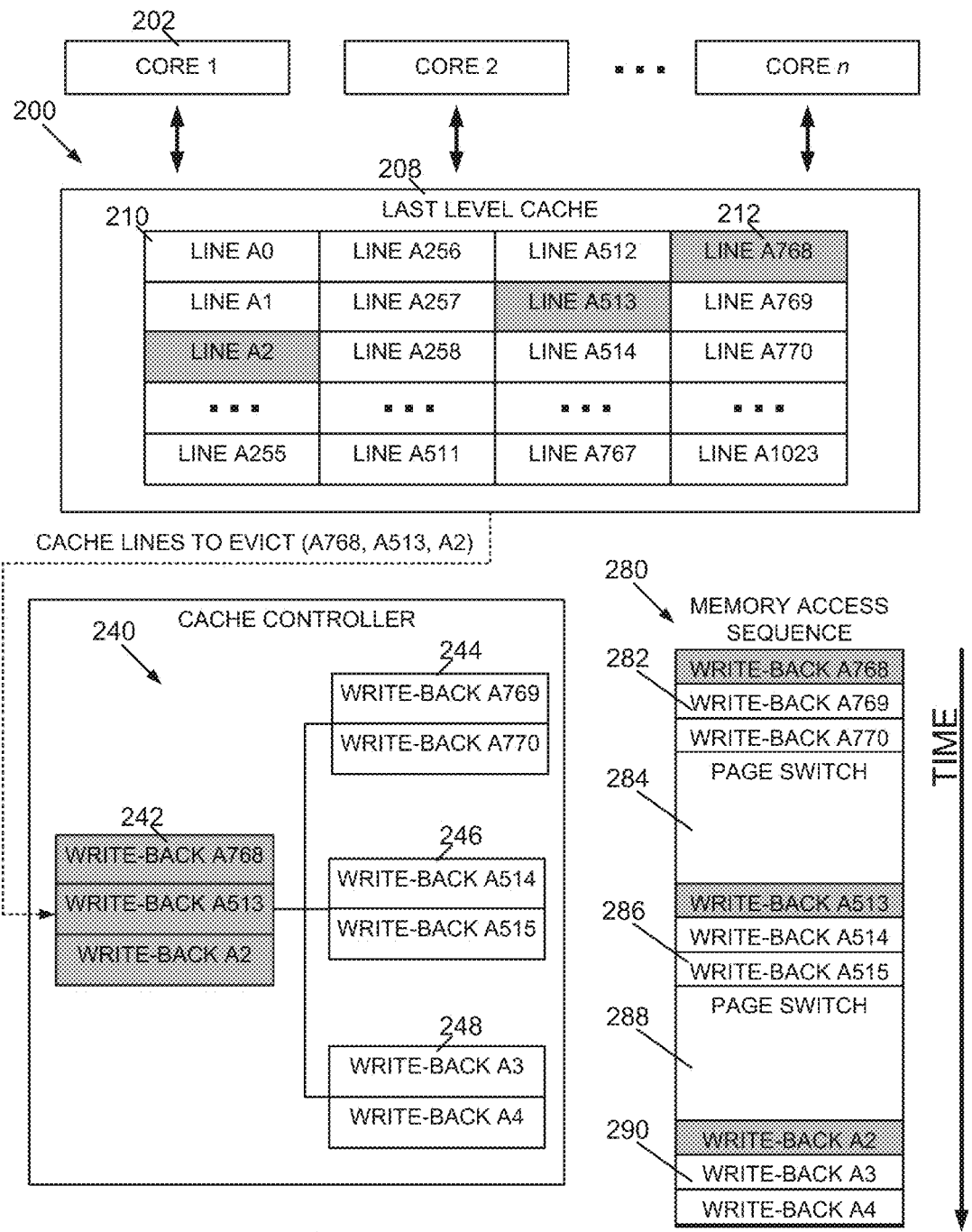
FIG. 2 depicts a modification to a write-back procedure, where a cache controller is configured to cause a pre-cleaning of two dirty cache lines when a first dirty cache line is evicted from cache.

FIG. 2 depicts a modification to a write-back procedure, where a cache controller 240 is configured to cause a pre-cleaning of two dirty cache lines when a first dirty cache line is evicted from cache. At 200, n processing cores 202 are coupled to a last level cache 208. The last level cache 208 may be microprocessor cache memory. The last level cache 208 is located at a last level of the cache before a memory controller associated with a main memory. As described above with respect to FIG. 1, when seeking to read or write to the main memory, the n processing cores 202 instead interact directly with the cache (i.e., determining if the data to be read is found in the cache or writing data to the cache, which is later used to update the main memory). The last level cache 208 includes a plurality of lines of data 210 in a storage array. When new data is to be stored in the cache 208, certain of the lines 212 are evicted (i.e., lines of the cache 208 that are shaded, including line A768, line A513, and line A2). During the eviction, the data of these lines 212 is written to the main memory to make room for the new data in the cache 208.

In the modification of the write-back procedure, in response to the eviction of the cache lines A768, A513, and A2, the cache controller 240 searches for additional dirty cache lines to write to the main memory. In the example of FIG. 2, the cache controller 240 is configured to determine if two cache lines at memory addresses immediately following the cache line to be evicted are dirty. The eviction of a cache line is a triggering event, where the occurrence of the triggering event causes the cache controller 240 to perform the search for the two nearby dirty lines. Thus, write-back commands 242 to write-back the cache lines A768, A513, and A2 to the main memory cause the cache controller 240 to determine if lines A769 and A770 (244), lines A514 and A515 (246), and lines A3 and A4 (248) are dirty. If the lines 244, 246, 248 are dirty, they are cleaned, such that data of the lines 244, 246, 248 are written to the main memory.

A memory access sequence 280 illustrates a write-back of lines 242 originally scheduled for eviction, along with a write-back of the additional dirty cache lines 244, 246, 248. At time 282, cache lines A768, A769, and A770 are written from the last level cache 208 to the main memory. Because the cache lines A768, A769, and A770 are located on a same page of the main memory, no change in state must occur to write the additional lines A769 and A770 after writing the line A768 originally scheduled for eviction. Prior to writing cache lines A513, A514, and A515 at time 286, a page switch (i.e., change in state) occurs at time 284. Similarly, at time 288, a second page switch occurs prior to writing cache lines A2, A3, and A4 at time 290. A page switch is a period of time during which no reading or writing can occur in the main memory.

Because no page switches must occur between the writing of the nearby cache lines, performing the write-back of the additional cache lines 244, 246, 248 allows the additional lines to be written to the main memory at a relatively low cost. The preemptive writing of the additional lines 244, 246, 248 thus avoids a potentially higher cost that may have otherwise been incurred when the additional lines 244, 246, 248 were later evicted from the cache 208.

Figure 3:
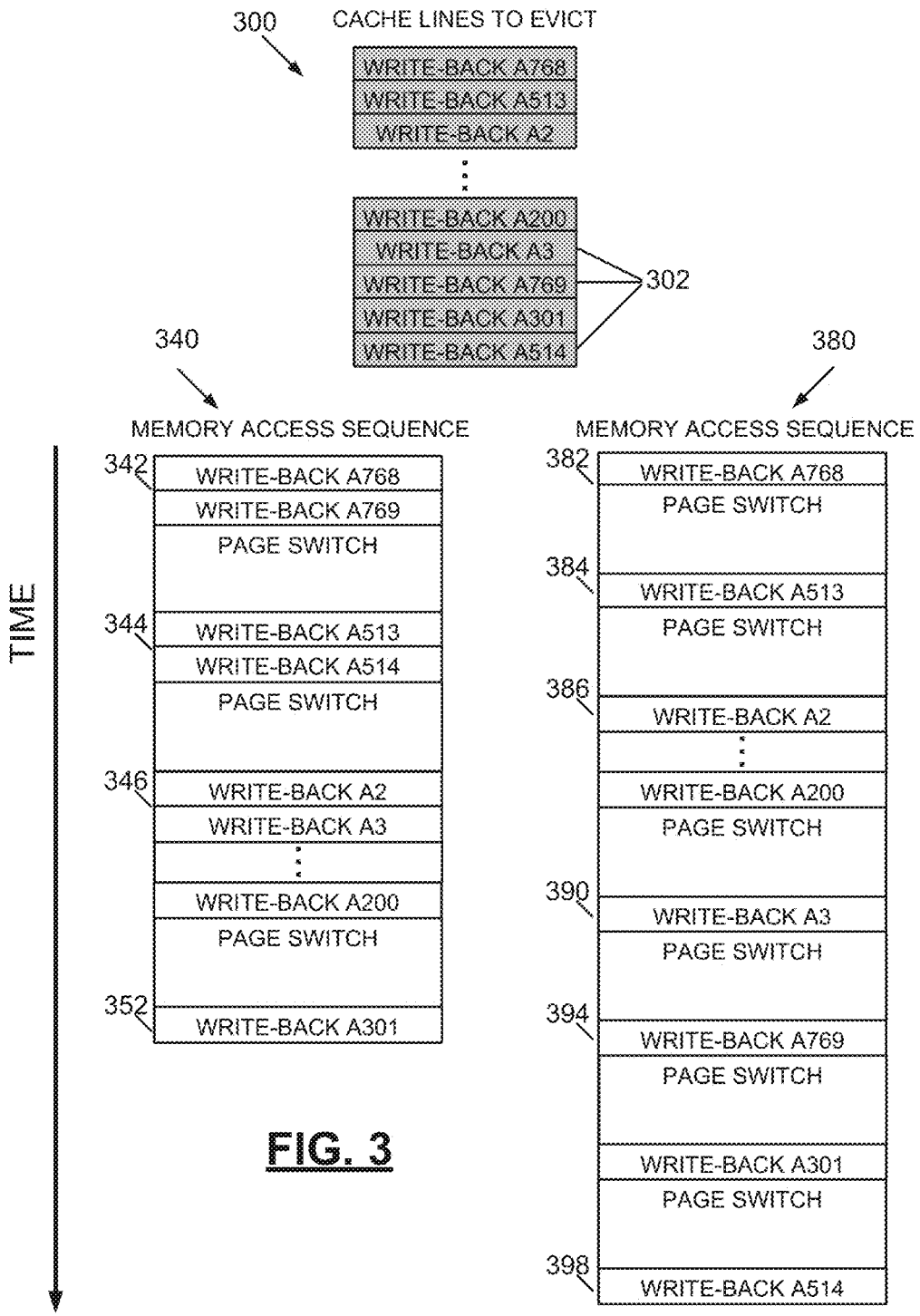
FIG. 3 illustrates a savings in time and power associated with writing back data for more than one dirty cache line when a capacity eviction occurs in a cache storage array.

FIG. 3 illustrates a savings in time and power associated with writing back data for more than one dirty cache line when a capacity eviction occurs in a cache storage array. At 300, a list of write-back commands for a plurality of cache lines to evict is illustrated. A first memory access sequence 340 associated with the list of write-back commands 300 is illustrated for a cache controller configured to search for a single extra dirty cache line when an eviction of a first cache line occurs. The single extra dirty cache line is a cache line immediately following the first cache line, and the cache controller is configured to perform a clean operation on the single extra dirty cache line (i.e., data from the single extra dirty cache line is written to the main memory so that its contents match those of the main memory). Thus, in the example of FIG. 3, a triggering procedure for the writing of the single extra dirty cache line is the capacity eviction and write-back of the first cache line, and pre-clean criteria specifies that the single extra dirty cache line is to be cleaned upon an occurrence of the triggering event.

At the first memory access sequence 340, a write-back of cache line A768 triggers the writing of the single extra dirty cache line A769 to the main memory at a time 342. Similarly, at times 344 and 346, a write-back of cache lines A513 and A2 trigger a writing of the adjacent dirty cache lines A514 and A3, respectively. As illustrated in the list of commands specifying the cache lines to evict 300, later commands 302 explicitly specify that cache lines A769, A514, and A3 are to be evicted from the cache. However, as illustrated in the first memory access sequence 340, because lines A769, A514, and A3 were preemptively cleaned in accordance with the triggering procedure and the pre-clean criteria, these lines no longer require a write-back on eviction. Thus, the first memory access sequence 340 ends at a time 352 with a write-back of line A301.

By contrast, a second memory access sequence 380 associated with the list of write-back commands 300 is illustrated for a cache controller that is not configured to write-back data for more than one dirty cache line when a capacity eviction occurs. The cache controller associated with the second memory access sequence 380 instead simply executes write-backs according to the list of cache lines to evict 300 and does not perform the preemptive write-backs illustrated at times 342, 344, and 346 of the first memory access sequence 340. Thus, at times 382, 384, and 386, single cache lines A768, A513, and A2, respectively, are written from the cache to main memory. At later points in time 390, 394, 398, the adjacent cache lines A3, A769, and A514 are written to the main memory, as required by the list of cache lines to evict 300. Because these lines of cache are each associated with pages of memory that are different from a page of memory associated with a preceding write-back command, a page switch (i.e., a change of state in the main memory) must occur before each of these write-backs.

The page switches that occur prior to the write-backs of cache lines A3, A769, and A514 cause the second memory access sequence 380 to conclude at a later point in time 398 as versus the first memory access sequence 340. FIG. 3 illustrates that by preemptively writing back the cache lines A3, A769, and A514 at a time when these lines can be written to the main memory without having to execute a page switch (i.e., when adjacent cache lines are already being written back, such that the page being written to is already open), a savings in time and power can be achieved.

Figure 4:
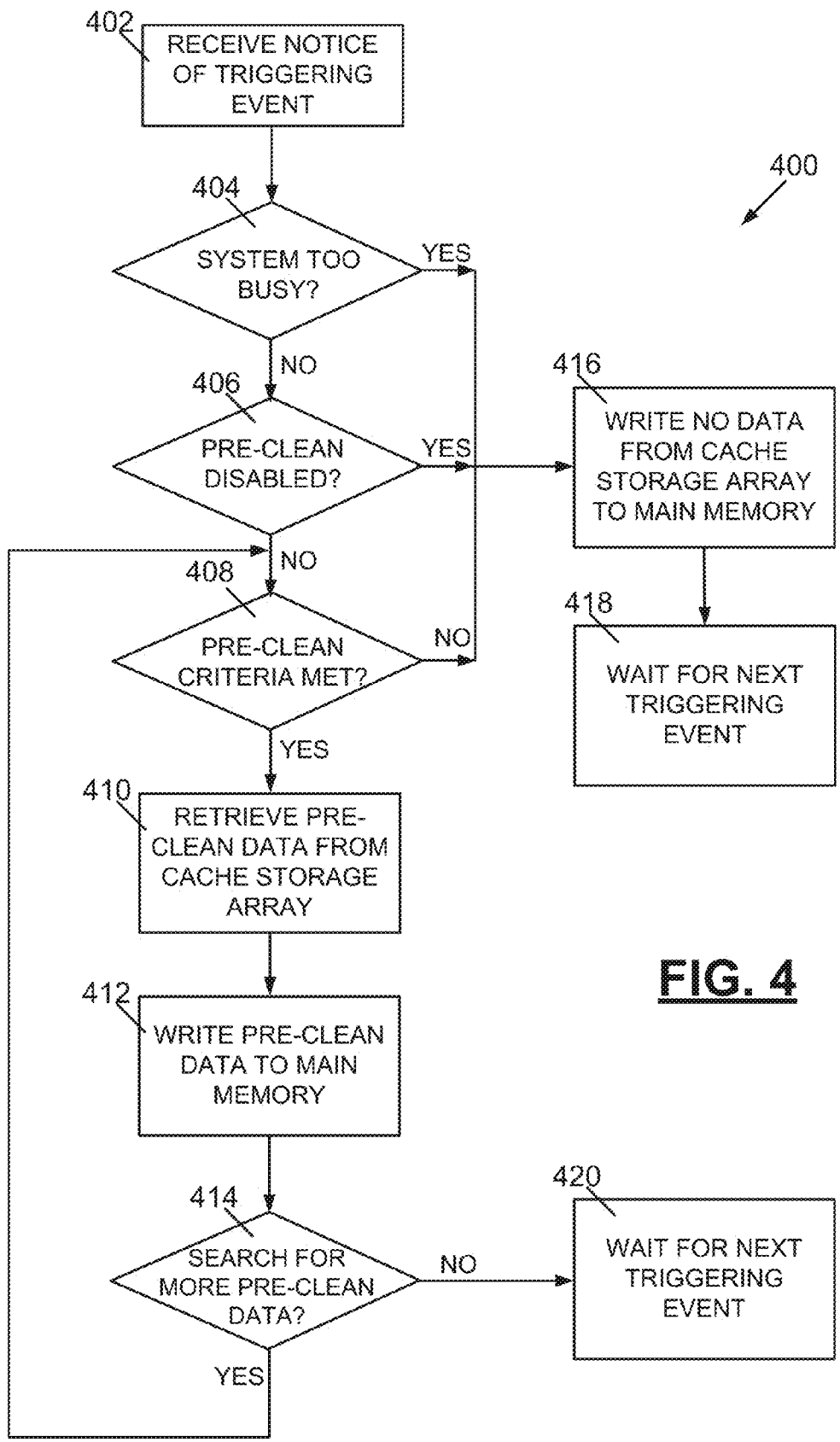
FIG. 4 is a flowchart illustrating example steps executed by a cache controller for writing data from a cache storage array to a main memory in accordance with pre-clean criteria.

FIG. 4 is a flowchart 400 illustrating example steps executed by a cache controller for writing data from a cache storage array to a main memory in accordance with pre-clean criteria. At 402, notice of an occurrence of a triggering event is received by the cache controller. In one example, the triggering event is a writing of data from the cache storage array to the main memory, where the writing of the data is performed as part of a write-back procedure that occurs during a cache eviction. In other examples, the triggering event is an expiration of a timer or another detectable event.

At steps 404, 406, 408, determinations are made to decide whether certain cache lines will be preemptively cleaned prior to receiving explicit commands on the certain cache lines. At 404, a determination is made as to whether the computer system is too busy to perform the preemptive cleaning of the certain cache lines. Although the preemptive cleaning of the certain cache lines may result in a savings in time and power (e.g., as illustrated in the comparison of the memory access sequences 340 and 380 of FIG. 3), performing the preemptive cleaning may have an associated cost in time and power at the time of the preemptive cleaning. Thus, if the computer system is very busy, the preemptive cleaning procedure is disabled, and at 416, no data is written from the cache storage array to the main memory. With no data to preemptively write to the main memory, at 418, the cache controller waits for a next triggering event. Similarly, at 406, a determination is made as to whether the preemptive pre-clean procedure is disabled. The pre-clean procedure may be disabled in a variety of ways (e.g., via a command received at a command interface or upon an occurrence of certain events that cause the disabling) and may be disabled regardless of how busy the system is. If the pre-clean procedure is disabled, at 416, no data is written from the cache storage array to the main memory, and at 418, the cache controller waits for the next triggering event.

If the system is not too busy and the pre-clean procedure has not been disabled, at 408, a determination is made as to whether pre-clean criteria have been met. The pre-clean criteria identify the data that is to be retrieved from the cache storage array and written to the main memory prior to receiving an explicit command on the data. The pre-clean criteria may require that the data to be retrieved and written to the main memory be included in a dirty cache line, where the dirty cache line has a state that does not match a state in the main memory. In one example, the pre-clean criteria includes a requirement that the data to be pre-cleaned be associated with one or more memory addresses that are within a threshold number of memory addresses from data to be written from the cache to the main memory as part of a cache eviction procedure. In another example, the pre-clean criteria includes a requirement that the data to be pre-cleaned be associated with cache lines that are adjacent to cache lines to be written to the main memory as part of the cache eviction procedure. In another example, the pre-clean criteria includes a requirement that the data to be pre-cleaned be associated with cache lines that are located on a same bank and a same page of memory as cache lines to be written to the main memory as part of the cache eviction procedure. Searching for dirty cache lines to clean according to the pre-clean criteria may be executed at a same time as a writing of data that occurs during the cache eviction procedure. If the pre-clean criteria are not met, at 416, no data is written from the cache storage array to the main memory, and at 418, the cache controller waits for the next triggering event.

If the pre-clean criteria are met, at 410, pre-clean data is retrieved from the cache storage array in accordance with the pre-clean criteria. As noted above, the pre-clean data is data that is retrieved from the cache storage array prior to receiving a command on the data. At 412, the retrieved pre-clean data is written from the cache storage array to the main memory, such that a memory address associated with the pre-clean data has identical contents in the storage array and in the main memory.

At 414, a determination is made as to whether to search for more pre-clean data. The determination at 414 may be used to implement a mechanism for dynamically searching for data to pre-clean based on the previously retrieved pre-clean data. If the determination is made to search for more pre-clean data, the process returns to 408, where a determination is made as to whether further data meeting the pre-clean criteria can be located. In an example, the further data meeting the pre-clean criteria are additional dirty cache lines that are adjacent to a first dirty cache line meeting the pre-clean criteria. If the determination is made to not search for more pre-clean data, at 420, the cache controller waits for the next triggering event.

Figure 5:
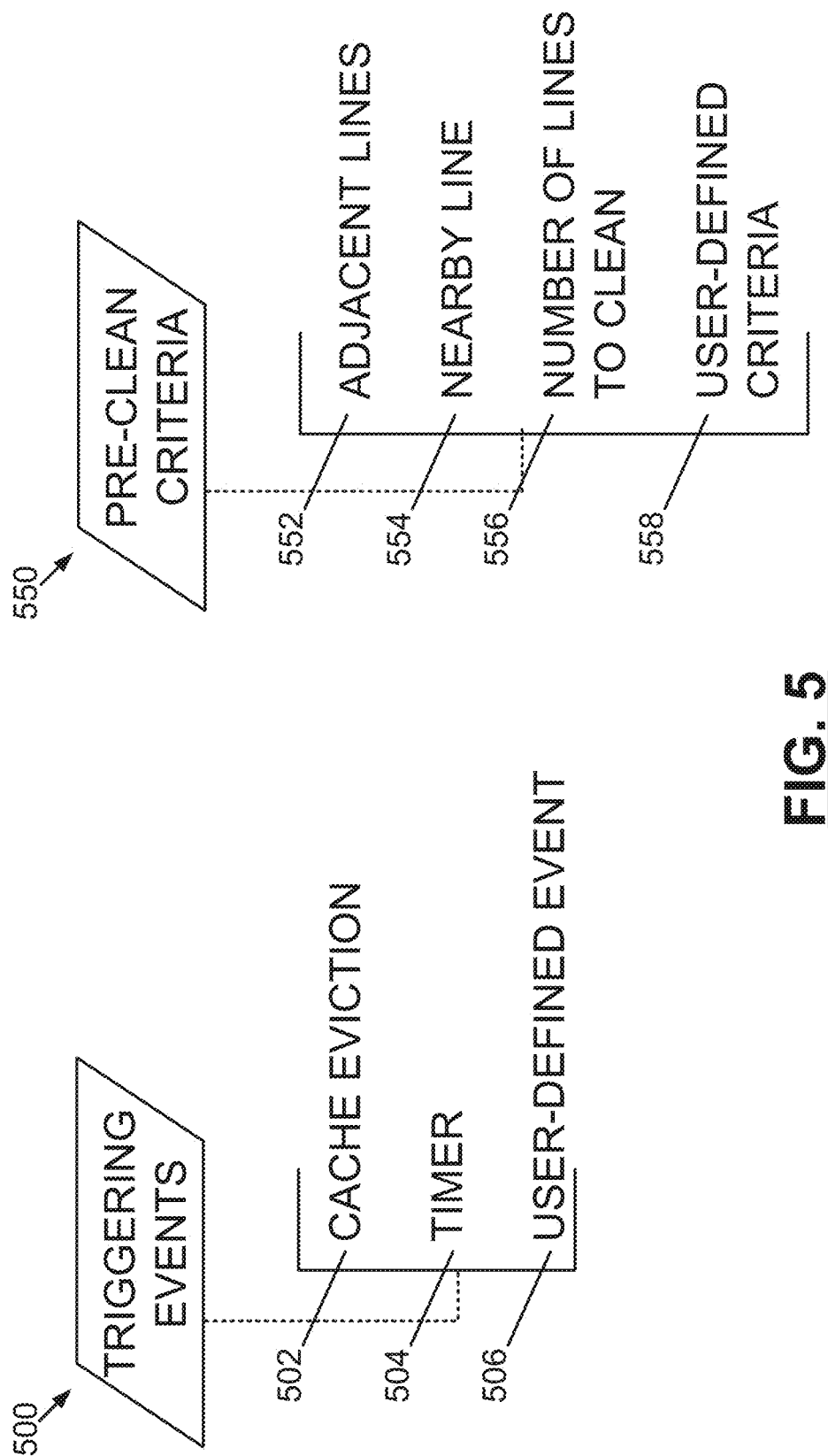
FIG. 5 depicts triggering events and pre-clean criteria that may be used in a modification of a cache controller for performing preemptive cleaning of cache lines in a computer system.

FIG. 5 depicts triggering events 500 and pre-clean criteria 550 that may be used in a modification of a cache controller for performing preemptive cleaning of cache lines in a computer system. The triggering events 500 and the pre-clean criteria 550 of FIG. 5 may be parameters or variables stored in cache logic of the cache controller and accessed by the cache controller to perform the preemptive cleaning. In another example, the triggering events 500 and the pre-clean criteria 550 may be introduced via a command interface and stored in the cache logic or in another memory device. Using the command interface, the triggering events 500 and the pre-clean criteria 550 may both be configurable by a user of the computer system.

An occurrence of a triggering event 500 provides notice to the cache controller to perform the preemptive cleaning of the cache lines. The triggering events 500 include a cache eviction 502 (i.e., a write-back of a cache line to a main memory in response to a need to store new data in the cache), an expiration of a timer 504, or another detectable, user-defined event 506. The pre-clean criteria 550 identify the cache lines that are to be preemptively cleaned and in one example specify that only dirty cache lines adjacent to a first cache line 552 are to be cleaned. In another example, the pre-clean criteria 550 specify that all dirty cache lines "nearby" a first cache line 554 are to be cleaned. A threshold value identifying a number of memory locations or a different algorithm may be used to determine which cache lines are considered "nearby." In another example, the pre-clean criteria 550 include a predetermined number of dirty cache lines that are to be cleaned 556. Other user-defined criteria 558 may be supplied to set or modify the pre-clean criteria 550. In one example, the user-defined criteria 558 specify a maximum amount of time that should be spent searching for dirty lines to be cleaned.

Figure 6:
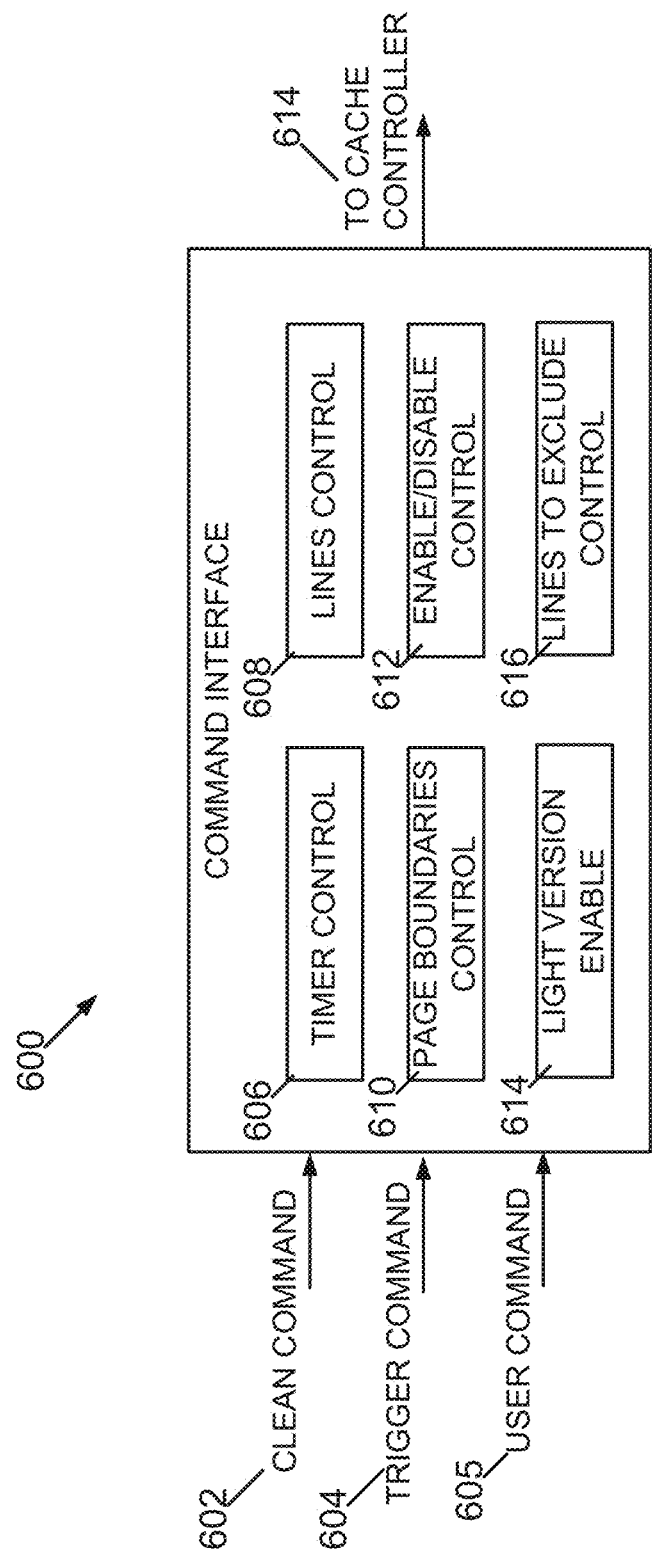
FIG. 6 illustrates a command interface used to introduce clean commands and other operational parameters to a cache controller.

FIG. 6 illustrates a command interface 600 used to introduce clean commands 602 and other operational parameters to a cache controller. The command interface 600 is configured to receive the clean commands 602, trigger commands 604 specifying trigger parameters, and various other user commands 605. In response to receiving these commands 602, 604, 605, the command interface 600 is configured to supply an output 614 to the cache controller, which uses the output 614 in performing the preemptive cleaning operation described in the preceding figures.

The command interface 600 includes a number of control modules that can be accessed via the input commands 602, 604, 605. Timer control 606 allows a user of the command interface 600 to specify a timer value, where an expiration of the timer value serves as a triggering event to the cache controller for performing the preemptive cleaning. Lines control 608 allows the user of the command interface 600 to specify a number of cache lines to be preemptively cleaned. The lines control 608 is thus used to set or modify pre-clean criteria of the cache controller, where the pre-clean criteria identify the cache lines that are to be written from a cache storage array to a main memory prior to receiving a command on the cache lines. Page boundaries control 610 allows the user of the command interface 600 to specify page boundaries of the main memory, such that the cache controller can use the specified page boundaries to determine if proposed clean commands are effective in allowing multiple cache lines to be written to the same page of the main memory. Enable/disable control 612 is used to enable or disable the preemptive cleaning procedure based on a user command.

Light version enable 614 is used to enable a light version of the preemptive cleaning operation. In the light version, the pre-clean criteria are modified to target a cache line with a same "tag" as a recently written cache line. Lines to exclude control 616 allows certain cache lines to be excluded from the preemptive cleaning procedure. For example, the lines to exclude control 616 may be used to exclude a cache line from being pre-cleaned based on a determination that the cache line is or is not part of a particular memory stream. In another example, the lines to exclude control 616 is used to exclude a dirty cache line from cleaning if the dirty cache line is known to also be dirty in a lower level cache (i.e., cache that is not last level cache). In the example of FIG. 6, the user interacting with the command interface 600 may be a person or a computer device (e.g., a processor or one or more transitory or non-transitory computer-readable storage mediums containing instructions configured to interact with the command interface 600).

Figure 7:
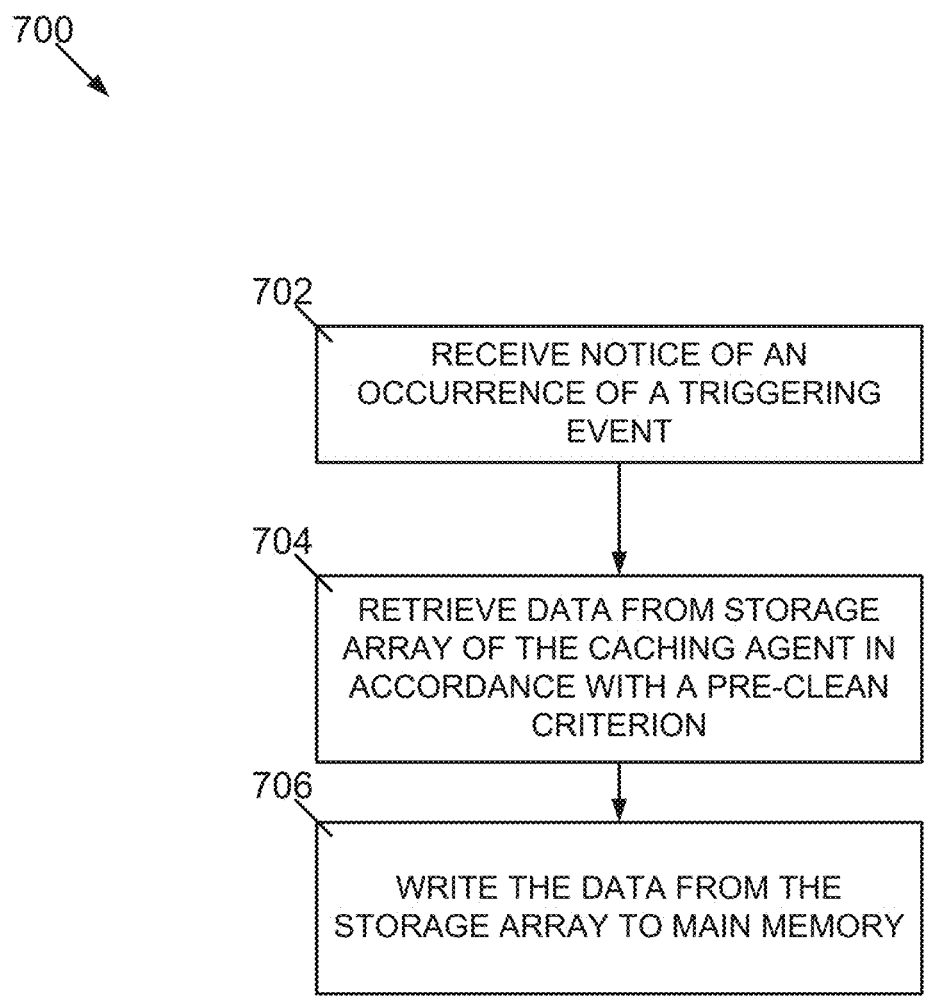
FIG. 7 is a flowchart illustrating a method for writing data from a caching agent to a main memory in a computer system.

FIG. 7 is a flowchart 700 illustrating a method for writing data from a caching agent to a main memory in a computer system. At 702, notice of an occurrence of a triggering event is received. At 704, in response to the receipt of the notice, data is retrieved from a storage array of the caching agent in accordance with a pre-clean criterion. The pre-clean criterion identifies the data that is retrieved from the storage array prior to receiving a command on the data. At 704, the data is written from the storage array to the main memory. The writing of the data causes a memory address associated with the data to have identical contents in the storage array and in the main memory.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A method for writing data from a caching agent to a main memory in a computer system, the method comprising:
   receiving notice that a cache line of the caching agent has been evicted, the eviction of the cache line including:
      opening a page of the main memory,
      writing data of the cache line to the page, and
      removing the data of the cache line from the caching agent; and
   in response to the receipt of the notice and prior to a closing of the page:
      identifying one or more other cache lines of the caching agent based on a proximity of the one or more other cache lines to the evicted cache line, each of the one or more other cache lines being a dirty cache line that is different than the evicted cache line, wherein the one or more other cache lines of the caching agent are identified based on a pre-clean criterion that includes a requirement that each of the one or more other cache lines be associated with a memory address that differs from a memory address of the evicted cache line by a threshold number of memory address locations, and
      writing all data of the one or more other cache lines to the main memory without performing an eviction of the one or more other cache lines.

2. The method of claim 1, wherein the caching agent is a microprocessor cache.

3. The method of claim 1, wherein the dirty cache line has a state that does not match a state in the main memory.

4. The method of claim 1, wherein the caching agent includes a storage array that is a last level of cache before a memory controller coupled to the main memory.

5. The method of claim 1, further comprising:
   obtaining the pre-clean criterion from a command interface.

6. The method of claim 1, wherein in the identifying of the one or more other cache lines, a number of cache lines to be identified is determined based on the pre-clean criterion that defines the number.

7. A system for writing data from a caching agent to a main memory in a computer system, the system comprising:
   a processing unit;
   the caching agent coupled to the processing unit;
   a main memory coupled to the caching agent; and
   a cache controller coupled to each of the processing unit and the main memory, wherein the cache controller is configured to receive notice that a cache line of the caching agent has been evicted, the eviction of the cache line including:
      opening a page of the main memory,
      writing data of the cache line to the page, and
      removing the data of the cache line from the caching agent; and
   wherein, in response to the receipt of the notice and prior to closing the page, the cache controller is further configured to:
      identify one or more other cache lines of the caching agent based on a proximity of the one or more other cache lines to the evicted cache line, each of the one or more other cache lines being a dirty cache line that is different than the evicted cache line, wherein the one or more other cache lines of the caching agent are identified based on a pre-clean criterion that includes a requirement that each of the one or more other cache lines be associated with a memory address that differs from a memory address of the evicted cache line by a threshold number of memory address locations, and
      cause all data of the one or more other cache lines to be written to the main memory without performing an eviction of the one or more other cache lines.

8. The system of claim 7, wherein the caching agent is a microprocessor cache.

9. The system of claim 7, wherein the dirty cache line has a state that does not match a state in the main memory.

10. The system of claim 7, wherein the caching agent includes a storage array that is a last level of cache before a memory controller coupled to the main memory.

11. The system of claim 7, wherein the cache controller is further configured to:
    obtain the pre-clean criterion from a command interface.

12. The system of claim 7, wherein in the identifying of the one or more other cache lines, a number of cache lines to be identified is determined based on the pre-clean criterion that defines the number.

13. The method of claim 1, wherein the writing of the data of the one or more other cache lines to the main memory is performed prior to receiving an explicit command to write the data of the one or more other cache lines.

14. The method of claim 1, further comprising:
    performing the eviction of the one or more other cache lines after the closing of the page, wherein the eviction does not include writing the data of the one or more other cache lines to the main memory.

15. The system of claim 7, wherein the writing of the data of the one or more other cache lines to the main memory is performed prior to receiving an explicit command to write the data of the one or more other cache lines.

16. The system of claim 7, wherein the cache controller is further configured to:
    perform the eviction of the one or more other cache lines after the closing of the page, wherein the eviction does not include writing the data of the one or more other cache lines to the main memory.

17. A method for writing data from a caching agent to a main memory in a computer system, the method comprising:
    receiving notice that a cache line of the caching agent has been evicted, the eviction of the cache line including:
       opening a page of the main memory,
       writing data of the cache line to the page, and
       removing the data of the cache line from the caching agent; and
    in response to the receipt of the notice and prior to a closing of the page:
       identifying one or more other cache lines of the caching agent based on a proximity of the one or more other cache lines to the evicted cache line, each of the one or more other cache lines being a dirty cache line that is different than the evicted cache line, wherein the one or more other cache lines of the caching agent are identified based on a pre-clean criterion that includes a requirement that each of the one or more other cache lines be associated with a memory address that is adjacent to a memory address of the evicted cache line, and writing all data of the one or more other cache lines to the main memory without performing an eviction of the one or more other cache lines.

18. The method of claim 17, wherein the writing of the data of the one or more other cache lines to the main memory is performed prior to receiving an explicit command to write the data of the one or more other cache lines.

19. A system for writing data from a caching agent to a main memory in a computer system, the system comprising:
   a processing unit;
   the caching agent coupled to the processing unit;
   a main memory coupled to the caching agent; and
   a cache controller coupled to each of the processing unit and the main memory, wherein the cache controller is configured to receive notice that a cache line of the caching agent has been evicted, the eviction of the cache line including:
      opening a page of the main memory,
      writing data of the cache line to the page, and
      removing the data of the cache line from the caching agent; and
   wherein, in response to the receipt of the notice and prior to closing the page, the cache controller is further configured to:
      identify one or more other cache lines of the caching agent based on a proximity of the one or more other cache lines to the evicted cache line, each of the one or more other cache lines being a dirty cache line that is different than the evicted cache line, wherein the one or more other cache lines of the caching agent are identified based on a pre-clean criterion that includes a requirement that each of the one or more other cache lines be associated with a memory address that is adjacent to a memory address of the evicted cache line, and
      cause all data of the one or more other cache lines to be written to the main memory without performing an eviction of the one or more other cache lines.

20. The system of claim 19, wherein the writing of the data of the one or more other cache lines to the main memory is performed prior to receiving an explicit command to write the data of the one or more other cache lines.

* * * * *